United States Patent
Thubert et al.

(10) Patent No.: US 9,749,410 B2
(45) Date of Patent: Aug. 29, 2017

(54) USING BIT INDEX EXPLICIT REPLICATION (BIER) IN LOW-POWER AND LOSSY NETWORKS

(71) Applicant: Cisco Technology, Inc., San Jose, CA (US)

(72) Inventors: Pascal Thubert, La Colle sur Loup (FR); Ijsbrand Wijnands, Leuven (BE); Gregory Shepherd, Eugene, OR (US)

(73) Assignee: Cisco Technology, Inc., San Jose, CA (US)

( * ) Notice: Subject to any disclaimer, the term of this patent is extended or adjusted under 35 U.S.C. 154(b) by 237 days.

(21) Appl. No.: 14/661,458

(22) Filed: Mar. 18, 2015

(65) Prior Publication Data

US 2016/0142248 A1    May 19, 2016

Related U.S. Application Data

(60) Provisional application No. 62/081,342, filed on Nov. 18, 2014.

(51) Int. Cl.
*H04L 12/24* (2006.01)
*H04L 12/741* (2013.01)
(Continued)

(52) U.S. Cl.
CPC .... *H04L 67/1095* (2013.01); *G06F 17/30324* (2013.01); *G06F 17/30958* (2013.01);
(Continued)

(58) Field of Classification Search
CPC ......... G06F 17/30324; G06F 17/30958; H04L 41/085; H04L 41/0823; H04L 41/083;
(Continued)

(56) References Cited

U.S. PATENT DOCUMENTS 8,631,043 B2 *   1/2014   Hao ................. G06F 17/30958
                                                    707/796
2008/0263208 A1  10/2008  White
(Continued)

OTHER PUBLICATIONS

International Search Report and Written Opinion dated Mar. 7, 2016 in connection with PCT/US2015/059893.
Bergmann, C. et al.: "Constrained-Cast: Source-Routed Multicast for RPL; draft-bergmann-bier-ccast-00.txt." Internet Engineering Task Forcce, IEFT; STANDARDWORKINGDRAFT, Internet Society (ISOC), 4, Rue des Falaises CH—1205 Geneva, Switzerland, Nov. 10, 2014, pp. 1-6.
(Continued)

*Primary Examiner* — Ahmed Elallam
(74) *Attorney, Agent, or Firm* — Parker Ibrahim & Berg LLC; James M. Behmke; Stephen D. LeBarron

(57) ABSTRACT

In one embodiment, a first node in a network receives one or more bitmaps from one or more child nodes of the first node according to a directed acyclic graph (DAG). Each of the one or more child nodes is associated with a corresponding unique bit position in the one or more bitmaps. The first node stores, in a forwarding table, the one or more bitmaps received from the one or more child nodes of the first node. The first node receives a message that includes a destination bitmap that identifies one or more destinations of the message via one or more set bits at bit positions associated with the one or more child nodes. The first node forwards the message towards the identified one or more destinations based on the destination bitmap and the one or more bitmaps stored in the forwarding table of the first node.

18 Claims, 12 Drawing Sheets

(51) Int. Cl.

| | | |
|---|---|---|
| *H04L 12/751* | (2013.01) | |
| *H04L 29/08* | (2006.01) | |
| *G06F 17/30* | (2006.01) | |
| *H04L 29/12* | (2006.01) | |
| *H04W 40/02* | (2009.01) | |
| *H04W 84/18* | (2009.01) | |
| *H04L 12/753* | (2013.01) | |

(52) U.S. Cl.
CPC ............ *H04L 45/02* (2013.01); *H04L 45/48* (2013.01); *H04L 45/745* (2013.01); *H04L 61/2038* (2013.01); *H04L 61/6004* (2013.01); *H04W 40/02* (2013.01); *H04W 84/18* (2013.01)

(58) Field of Classification Search
CPC ......... H04L 45/02; H04L 45/18; H04L 45/34; H04L 45/48; H04L 45/74; H04L 45/745; H04L 61/2038; H04L 61/6004; H04L 60/2069; H04L 67/10
See application file for complete search history.

(56) References Cited

U.S. PATENT DOCUMENTS

| | | | |
|---|---|---|---|
| 2010/0049860 A1 | 2/2010 | Kouvelas et al. | |
| 2012/0117208 A1 | 5/2012 | Shaffer et al. | |
| 2013/0028095 A1 | 1/2013 | Vasseur et al. | |
| 2013/0121335 A1 | 5/2013 | Hui et al. | |
| 2014/0092753 A1 | 4/2014 | Vasseur et al. | |
| 2016/0087936 A1* | 3/2016 | Akyurek | H04L 61/2015 709/226 |
| 2016/0127142 A1* | 5/2016 | Tian | H04L 12/1886 370/390 |
| 2016/0134518 A1* | 5/2016 | Callon | H04L 45/24 370/390 |
| 2016/0134535 A1* | 5/2016 | Callon | H04L 45/48 370/390 |

OTHER PUBLICATIONS

Wijnands, I. et al.: "Multicast Using Bit Index Explicit Replication; draft-wijnands-bier-architecture-01.txt" Internet Engineering Task Force, IETF; STANDARDWORKINGDRAFT, Internet Society (ISOC) 4, Rue des Falaises CH—1205 Geneva, Switzerland, Oct. 16, 2014, pp. 1-24.

Thubert, P. et al.: "A Routing Header Dispatch for 6LoWPAN; draft-thubert-6lo-routing-dispatch03.txt", Internet Engineering Task Force, IETF; STANDARDWORKINGDRAFT, Internet Society (ISOC), 4, Rue des Falaises CH—1205 Geneva, Switzerland, Jan. 19, 2015, pp. 1-21.

Eckert, T. et al.: "Traffic Engineering for Bit Index Explicit Replication BIER-TE; draft-Eckert-bier-te-arch-02.txt", Internet Engineering Task Force, IETF; STANDARDWORKINGDRAFT, Internet Society (ISOC), 4, Rue des Falaises CH—1205 Geneva, Switzerland, Oct. 19, 2015, pp. 1-30.

Winter, T. et al.: "RPL: IPv6 Routing Protocol for Low-Power and Lossy Networks; rfc6550.txt", Internet Engineering Task Force, IETF; STANDARD, Internet Society (ISOC), 4, Rue des Falaises CH—1205 Geneva, Switzerland, Mar. 26, 2012, pp. 1-157.

Reliable Multicast; http://en.wikipedia.org/wiki/Reliable_multicast; pp. 1-3.

Ijsbrand Wijnands, "Routing Over Low power and Lossy networks (roll) ietf wg mailing list", Nov. 4, 2014, pp. 1-4.

Header Encoding Design Considerations, pp. 147-148.

Wijnands et al., "Multicast using Bit Index Explicit Replication draft-wijnands-bier-architecture-04", Internet Engineering Task Force, http://tools.ietf.org/html/draft-wijnands-bier-architecture-04, Feb. 2, 2015, pp. 1-30.

Bergmann et al., "Constrained-Cast: Source-Routed Multicast for RPL draft-bergmann-bier-ccast-00", Network Working Group, Nov. 9, 2014, pp. 1-6.

Wijnands et al., "Encapsulation for Bit Index Explicit Replication in MPLS Networks draft-wijnands-mpls-bier encapsulation-02", Internet Engineering Task Force, Dec. 4, 2014, pp. 1-13.

\* cited by examiner

USING BIT INDEX EXPLICIT REPLICATION (BIER) IN LOW-POWER AND LOSSY NETWORKS

RELATED APPLICATIONS

This application claims priority to U.S. Provisional Application No. 62/081,342, filed Nov. 18, 2014, entitled: "USING BIT INDEX EXPLICIT REPLICATION (BIER) IN LOW-POWER AND LOSSY NETWORKS," by Thubert et al., the contents of which are herein incorporated by reference.

TECHNICAL FIELD

The present disclosure relates generally to computer networks, and, more particularly, to using bit index explicit replication (BIER) for forwarding in Low-Power and Lossy Networks (LLNs).

BACKGROUND

Low-Power and Lossy Networks (LLNs), e.g., sensor networks, have a myriad of applications, such as Smart Grid and Smart Cities. Various challenges are presented with LLNs, such as lossy links, low bandwidth, battery operation, low memory and/or processing capability of a device, etc. Changing environmental conditions may also affect device communications. For example, physical obstructions (e.g., changes in the foliage density of nearby trees, the opening and closing of doors, etc.), changes in interference (e.g., from other wireless networks or devices), propagation characteristics of the media (e.g., temperature or humidity changes, etc.), and the like, also present unique challenges to LLNs.

In contrast to many traditional computer networks, LLN devices typically communicate via shared-media links. For example, LLN devices that communicate wirelessly may communicate using overlapping wireless channels (e.g., frequencies). In other cases, LLN devices may communicate with one another using shared power line communication (PLC) links. For example, in a Smart Grid deployment, an electric utility may distribute power to various physical locations. At each location may be a smart meter that communicates wirelessly and/or using the electrical power distribution line itself as a communication medium.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
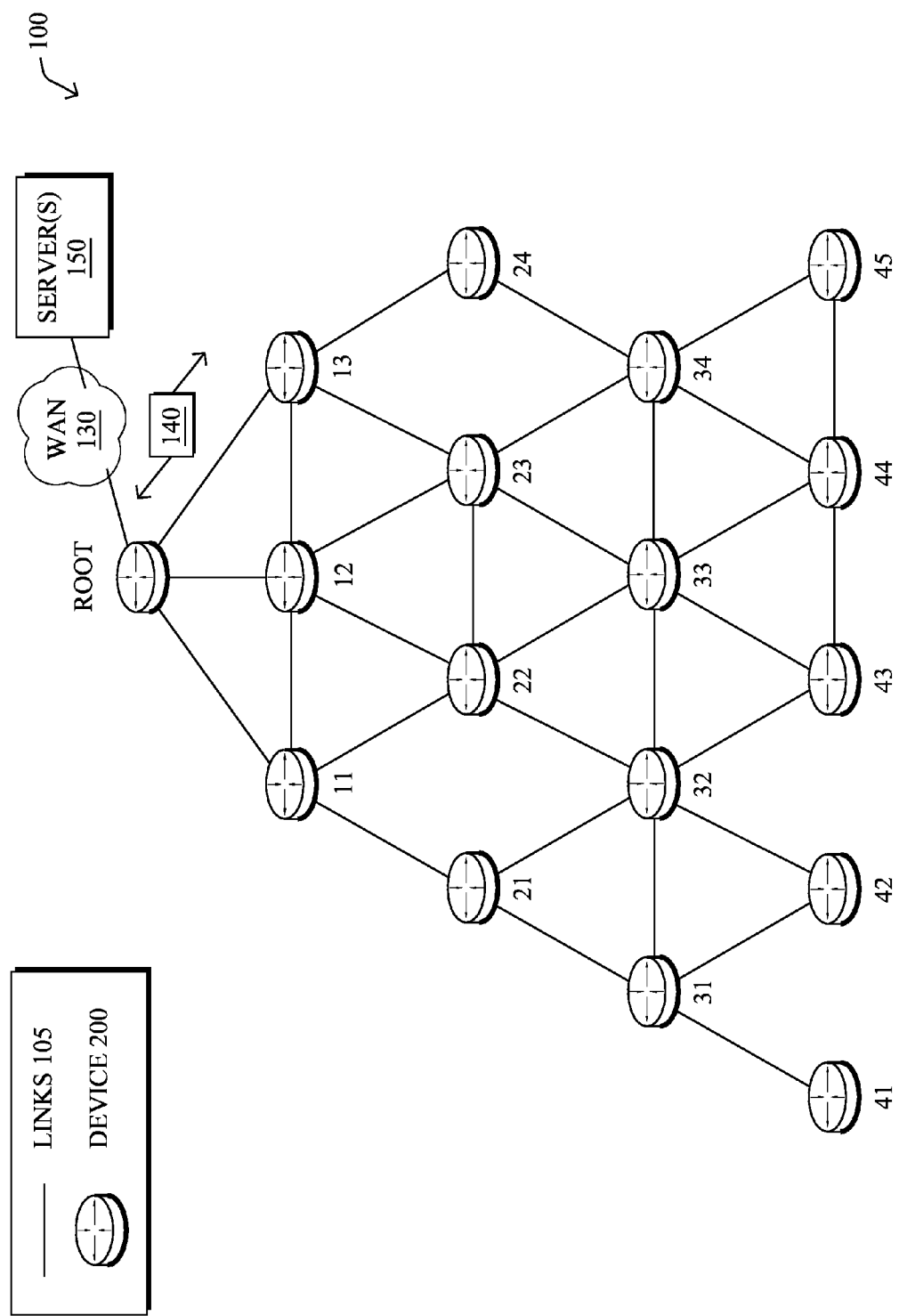
FIG. 1 illustrates an example communication network.

According to one or more embodiments of the disclosure, a first node in a network receives one or more bitmaps from one or more child nodes of the first node according to a directed acyclic graph (DAG). Each of the one or more child nodes is associated with a corresponding unique bit position in the one or more bitmaps. The first node stores, in a forwarding table, the one or more bitmaps received from the one or more child nodes of the first node. The first node receives a message that includes a destination bitmap that identifies one or more destinations of the message via one or more set bits at bit positions associated with the one or more child nodes. The first node forwards the message towards the identified one or more destinations based on the destination bitmap and the one or more bitmaps stored in the forwarding table of the first node.

In further embodiments, a device in a network assigns a plurality of nodes in the network to bitmaps. Each node is associated with a unique bit position in the bitmaps. The device causes construction of a directed acyclic graph (DAG) in the network by sending the assigned bitmaps to the plurality of nodes. A particular one of the plurality of node stores one or more of the bitmaps that are assigned to one or more children of the particular node in the DAG. The device determines a destination bitmap for a message based on the assigned bitmaps and one or more of the nodes selected as destinations for the message. The device sends the message and the destination bitmap to the particular node. The particular node forwards the message based on the destination bitmap and on the one or more of the bitmaps assigned to the one or more children of the particular node in the DAG.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE 1901.2, and others. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth.

FIG. 1 is a schematic block diagram of an example computer network 100 illustratively comprising nodes/devices 200 (e.g., labeled as shown, "Root," "11," "12," . . . "45," and described in FIG. 2 below) interconnected by various methods of communication. For instance, the links 105 may be wired links or shared media (e.g., wireless links, PLC links, etc.) where certain nodes 200, such as, e.g., routers, sensors, computers, etc., may be in communication with other nodes 200, e.g., based on distance, signal strength, current operational status, location, etc. The illustrative Root node, such as a field area router (FAR) of a FAN, may interconnect the local network with a WAN 130, which may house one or more other relevant devices such as management devices or servers 150, e.g., a network management server (NMS), a dynamic host configuration protocol (DHCP) server, a constrained application protocol (CoAP) server, etc. Those skilled in the art will understand that any number of nodes, devices, links, etc. may be used in the computer network, and that the view shown herein is for simplicity. Also, those skilled in the art will further understand that while the network is shown in a certain orientation, particularly with a "Root" node, the network 100 is merely an example illustration that is not meant to limit the disclosure.

Data packets 140 (e.g., traffic and/or messages sent between the devices/nodes) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

Figure 2:
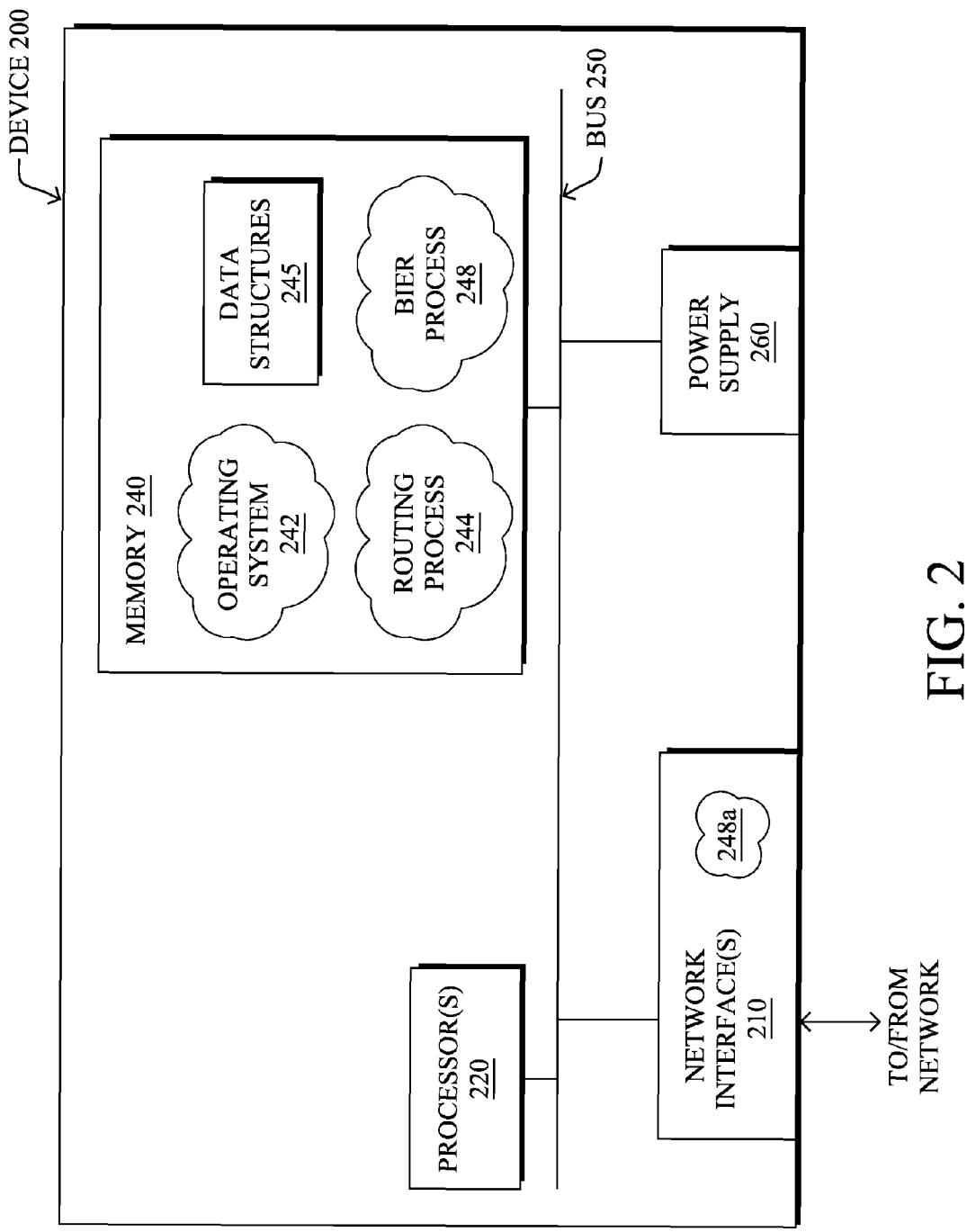
FIG. 2 illustrates an example network device/node.

FIG. 2 is a schematic block diagram of an example node/device 200 that may be used with one or more embodiments described herein, e.g., as any of the nodes shown in FIG. 1 above. The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 include the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise routing process/services 244 and a bit index explicit replication (BIER) process 248, as described herein. Note that while process 248 is shown in centralized memory 240, alternative embodiments provide for the process to be specifically operated within the network interfaces 210, such as a component of a MAC layer (process "248a").

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 includes computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) including, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);

2) Links are generally low bandwidth, such that control plane traffic must generally be bounded and negligible compared to the low rate data traffic;

3) There are a number of use cases that require specifying a set of link and node metrics, some of them being dynamic, thus requiring specific smoothing functions to avoid routing instability, considerably draining bandwidth and energy;

4) Constraint-routing may be required by some applications, e.g., to establish routing paths that will avoid non-encrypted links, nodes running low on energy, etc.;

5) Scale of the networks may become very large, e.g., on the order of several thousands to millions of nodes; and 6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

An example protocol is the Routing Protocol for Low-Power and Lossy Networks (RPL) specified in an Internet Engineering Task Force (IETF) Proposed Standard, Request for Comment (RFC) 6550, entitled "RPL: IPv6 Routing Protocol for Low Power and Lossy Networks" by Winter, et al. (March 2012), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

A DAG is a directed graph having the property that all edges (and/or vertices) are oriented in such a way that no cycles (loops) are supposed to exist. All edges are included in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Further, in certain embodiments, a sibling of a node within a DAG may be defined as any neighboring node which is located at the same rank within a DAG. Note that siblings do not necessarily share a common parent, and routes between siblings are generally not part of a DAG since there is no forward progress (their rank is the same). Note also that a tree is a kind of DAG, where each device/node in the DAG generally has one parent or one preferred parent.

DAGs may generally be built (e.g., by routing process 244) based on an Objective Function (OF). The role of the Objective Function is generally to specify rules on how to build the DAG (e.g. number of parents, backup parents, etc.).

In addition, one or more metrics/constraints may be advertised by the routing protocol to optimize the DAG against. Also, the routing protocol allows for including an optional set of constraints to compute a constrained path, such as if a link or a node does not satisfy a required constraint, it is "pruned" from the candidate list when computing the best path. (Alternatively, the constraints and metrics may be separated from the OF.) Additionally, the routing protocol may include a "goal" that defines a host or set of hosts, such as a host serving as a data collection point, or a gateway providing connectivity to an external infrastructure, where a DAG's primary objective is to have the devices within the DAG be able to reach the goal. In the case where a node is unable to comply with an objective function or does not understand or support the advertised metric, it may be configured to join a DAG as a leaf node. As used herein, the various metrics, constraints, policies, etc., are considered "DAG parameters."

Illustratively, example metrics used to select paths (e.g., preferred parents) may comprise cost, delay, latency, bandwidth, expected transmission count (ETX), etc., while example constraints that may be placed on the route selection may comprise various reliability thresholds, restrictions on battery operation, multipath diversity, bandwidth requirements, transmission types (e.g., wired, wireless, etc.). The OF may provide rules defining the load balancing requirements, such as a number of selected parents (e.g., single parent trees or multi-parent DAGs). Notably, an example for how routing metrics and constraints may be obtained may be found in an IETF RFC, entitled "Routing Metrics used for Path Calculation in Low Power and Lossy Networks"<RFC 6551> by Vasseur, et al. (March 2012 version). Further, an example OF (e.g., a default OF) may be found in an IETF RFC, entitled "RPL Objective Function 0"<RFC 6552> by Thubert (March 2012 version) and "The Minimum Rank Objective Function with Hysteresis" <RFC 6719> by O. Gnawali et al. (September 2012 version).

Building a DAG may utilize a discovery mechanism to build a logical representation of the network, and route dissemination to establish state within the network so that routers know how to forward packets toward their ultimate destination. Note that a "router" refers to a device that can forward as well as generate traffic, while a "host" refers to a device that can generate but does not forward traffic. Also, a "leaf" may be used to generally describe a non-router that is connected to a DAG by one or more routers, but cannot itself forward traffic received on the DAG to another router on the DAG. Control messages may be transmitted among the devices within the network for discovery and route dissemination when building a DAG.

According to the illustrative RPL protocol, a DODAG Information Object (DIO) is a type of DAG discovery message that carries information that allows a node to discover a RPL Instance, learn its configuration parameters, select a DODAG parent set, and maintain the upward routing topology. In addition, a Destination Advertisement Object (DAO) is a type of DAG discovery reply message that conveys destination information upwards along the DODAG so that a DODAG root (and other intermediate nodes) can provision downward routes. A DAO message includes prefix information to identify destinations, a capability to record routes in support of source routing, and information to determine the freshness of a particular advertisement. Notably, "upward" or "up" paths are routes that lead in the direction from leaf nodes towards DAG roots, e.g., following the orientation of the edges within the DAG. Conversely, "downward" or "down" paths are routes that lead in the direction from DAG roots towards leaf nodes, e.g., generally going in the opposite direction to the upward messages within the DAG.

Generally, a DAG discovery request (e.g., DIO) message is transmitted from the root device(s) of the DAG downward toward the leaves, informing each successive receiving device how to reach the root device (that is, from where the request is received is generally the direction of the root). Accordingly, a DAG is created in the upward direction toward the root device. The DAG discovery reply (e.g., DAO) may then be returned from the leaves to the root device(s) (unless unnecessary, such as for UP flows only), informing each successive receiving device in the other direction how to reach the leaves for downward routes. Nodes that are capable of maintaining routing state may aggregate routes from DAO messages that they receive before transmitting a DAO message. Nodes that are not capable of maintaining routing state, however, may attach a next-hop parent address. The DAO message is then sent directly to the DODAG root that can in turn build the topology and locally compute downward routes to all nodes in the DODAG. Such nodes are then reachable using source routing techniques over regions of the DAG that are incapable of storing downward routing state. In addition, RPL also specifies a message called the DIS (DODAG Information Solicitation) message that is sent under specific circumstances so as to discover DAG neighbors and join a DAG or restore connectivity.

Figure 3:
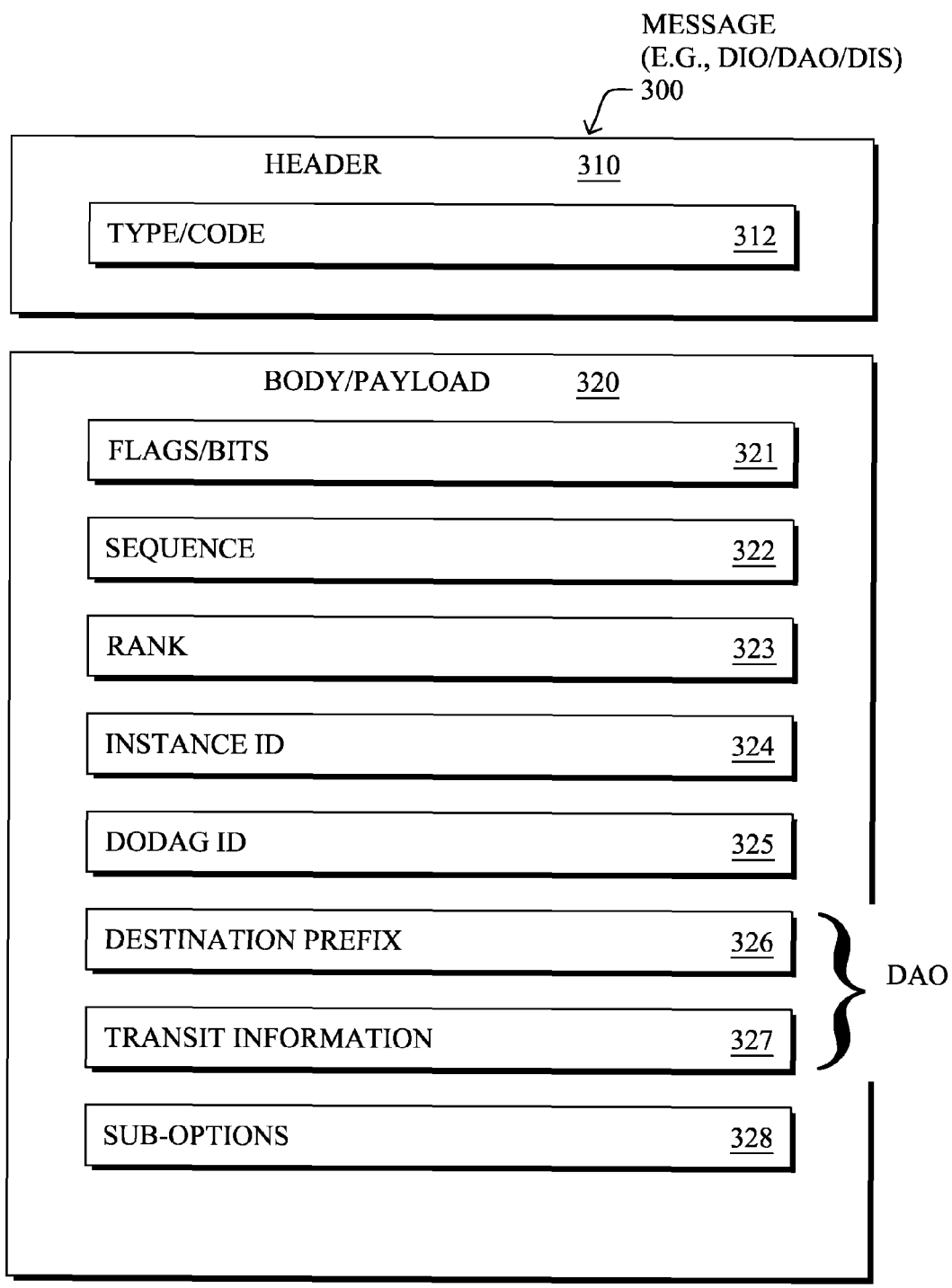
FIG. 3 illustrates an example routing protocol message format.

FIG. 3 illustrates an example simplified control message format 300 that may be used for discovery and route dissemination when building a DAG, e.g., as a DIO, DAO, or DIS message. Message 300 illustratively comprises a header 310 with one or more fields 312 that identify the type of message (e.g., a RPL control message), and a specific code indicating the specific type of message, e.g., a DIO, DAO, or DIS. Within the body/payload 320 of the message may be a plurality of fields used to relay the pertinent information. In particular, the fields may comprise various flags/bits 321, a sequence number 322, a rank value 323, an instance ID 324, a DODAG ID 325, and other fields, each as may be appreciated in more detail by those skilled in the art. Further, for DAO messages, additional fields for destination prefixes 326 and a transit information field 327 may also be included, among others (e.g., DAO_Sequence used for ACKs, etc.). For any type of message 300, one or more additional sub-option fields 328 may be used to supply additional or custom information within the message 300. For instance, an objective code point (OCP) sub-option field may be used within a DIO to carry codes specifying a particular objective function (OF) to be used for building the associated DAG. Alternatively, sub-option fields 328 may be used to carry other certain information within a message 300, such as indications, requests, capabilities, lists, notifications, etc., as may be described herein, e.g., in one or more type-length-value (TLV) fields.

Figure 4:
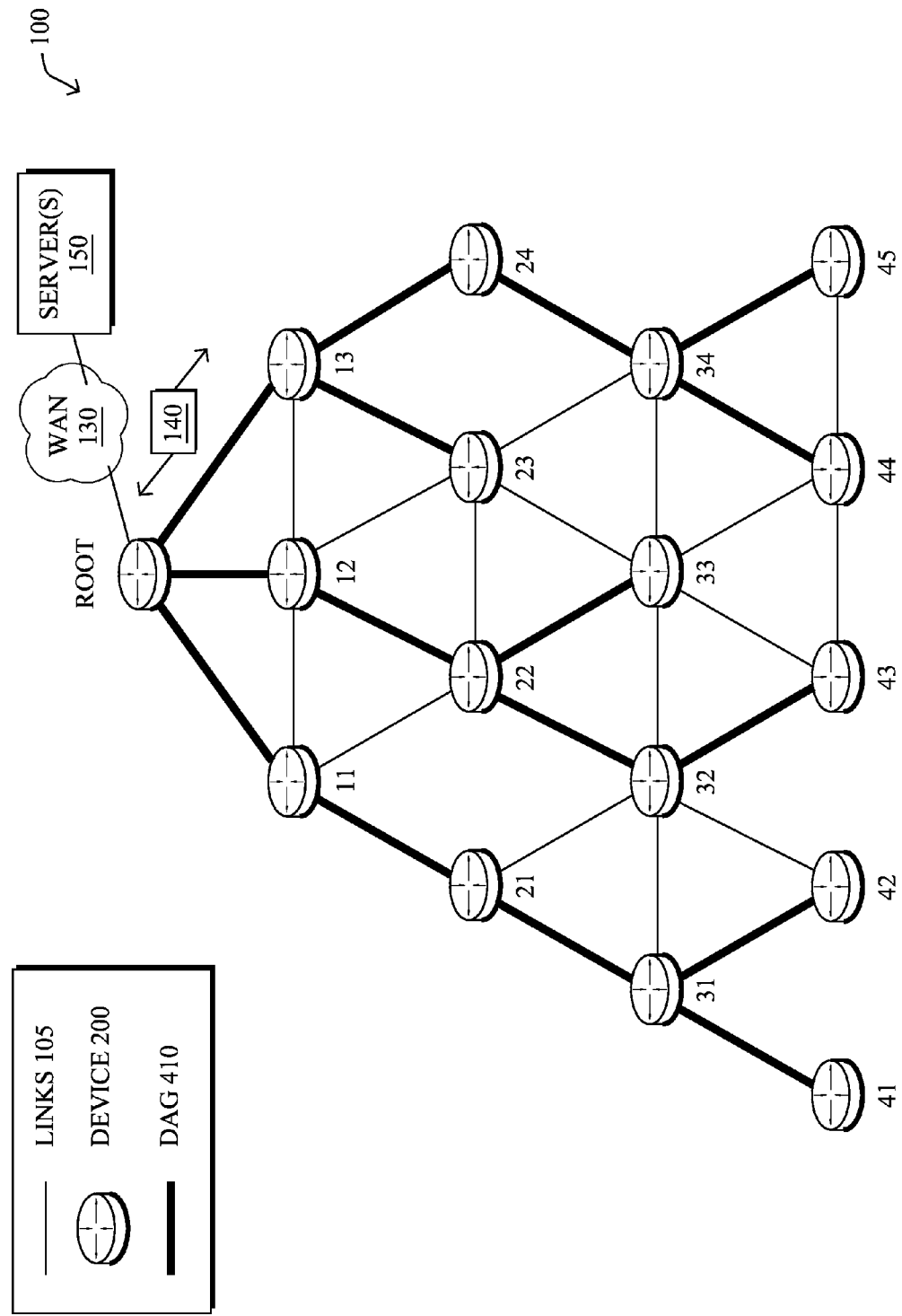
FIG. 4 illustrates an example directed acyclic graph (DAG) in the network.

FIG. 4 illustrates an example simplified DAG 410 that may be created, e.g., through the techniques described above, within network 100 of FIG. 1. For instance, certain links 105 may be selected for each node to communicate with a particular parent (and thus, in the reverse, to communicate with a child, if one exists). These selected links form the DAG 410 (shown as bolded lines), which extends from the root node toward one or more leaf nodes (nodes without children). Traffic/packets 140 (shown in FIG. 1) may then traverse the DAG 410 in either the upward direction toward the root or downward toward the leaf nodes, particularly as described herein.

Figure 5A:
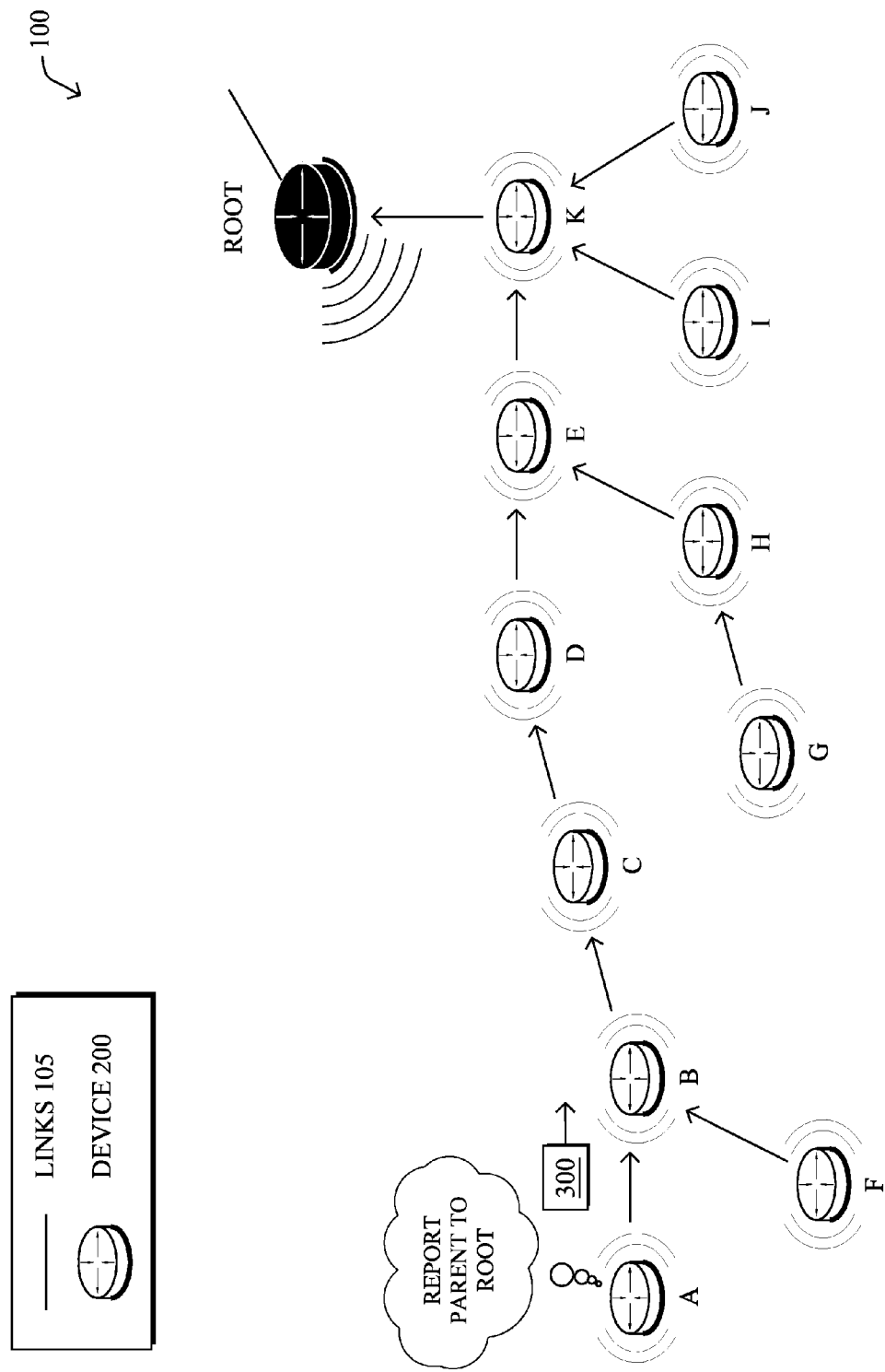
FIGS. 5A-5B illustrate an example of a DAG root maintaining node relationships.
Figure 5B:
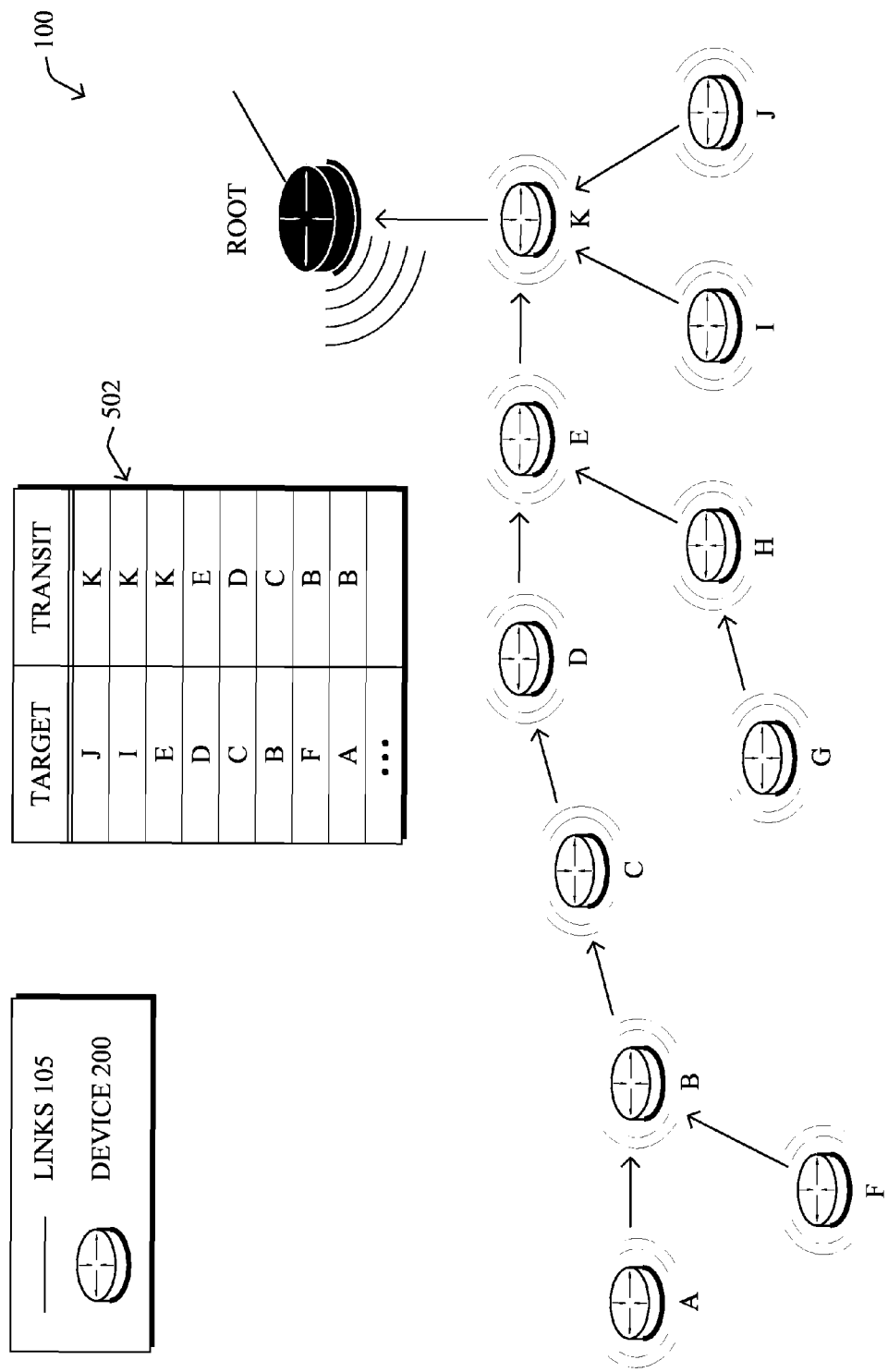

Referring now to FIGS. 5A-5B, examples are shown of routing in the network, according to various embodiments. As shown, assume that the devices/nodes 200 labeled "A" through "K" are connected to the Root node and the nodes use a distance vector routing protocol (e.g., RPL, etc.). Accordingly, any given node may select its own DAG parent and provide information regarding this selection up the DAG. For example, as shown in FIG. 5A, node A may select node B as its DAG parent (e.g., according to the objective function used and specified in a DIO message) and provide this information in message 300 (e.g., a DAO message) back towards the Root node.

As defined in RFC 6550, RPL generally supports two modes of operation: storing mode and non-storing mode. In storing mode, the intermediary nodes in the network store routing state information regarding their children. For example, in storing mode, node B may store information regarding its children, nodes A and F. However, as noted previously, many devices typical to LLNs have severely limited resources. Thus, non-storing mode is often implemented over that of storing mode, due to the limited nature of the intermediary nodes in the network. In non-storing mode, as shown in FIG. 5B, state information 502 regarding the nodes is stored instead by the Root node (e.g., based on the messages 300 returned to the Root from the nodes). In this case, to perform source routing, the Root node will need to build a source routing header (e.g., using a recursive lookup on state information 502), which may be detrimental to energy and frame size. In addition, source routing may not be workable in certain LLN implementations. For example, source routing is not typically workable in LLNs that use an 802.15.4 PHY layer in the 2.4 GHz band, which has an MTU of 127 bytes, a large chunk of which is consumed by security, due to the size constraints.

Using Bit Index Explicit Replication (BIER) in LLNs

As detailed above, many LLNs use a distance vector routing protocol (e.g., RPL, etc.) for purposes of making routing decisions. Since the LLN devices have highly constrained resources, including memory, minimizing the amount of state created may be paramount for both unicast and multicast forwarding operations. According to various aspects disclosed herein, BIER may be used in LLNs to build very small forwarding tables that can support unicast and/or multicast message forwarding. In particular, each distance vector node may be assigned a unique bit position in a bitmap for purposes of message forwarding and addressing in the local network.

In many LLN implementations, such as in advanced metering infrastructure (AMI) and advanced meter reading (AMR) implementations, individual mesh networks are usually maintained in relatively small groups and federated by a backbone. For example, a single mesh network of 96 nodes is typically considered to be quite large. In such a mesh, a bitmap of three, 32-bit DWORDs may be sufficient to include an individual bit per node. Another recent aspect is that processors used in LLN devices are evolving towards 32-bit operations. With 96 bits per bitmap and a 32-bit processor, bitmap-based routing would require only three AND operations per child. As would be appreciated, the amount of memory required per device to use the techniques herein is only one bitmap per child. For example, with 96 bits per bitmap, a device need only store 12 bytes per direct child, which means that the techniques herein may be used on devices that would otherwise normally use RPL in non-storing mode (e.g., due to their limited resources and the amount of state information that would otherwise need to be stored using storing mode).

Specifically, according to one or more embodiments of the disclosure as described in detail below, a first node in a network receives one or more bitmaps from one or more child nodes of the first node according to a directed acyclic graph (DAG). Each of the one or more child nodes is associated with a corresponding unique bit position in the one or more bitmaps. The first node stores, in a forwarding table, the one or more bitmaps received from the one or more child nodes of the first node. The first node receives a message that includes a destination bitmap that identifies one or more destinations of the message via one or more set bits at the corresponding bit positions associated with the one or more child nodes. The first node forwards the message towards the identified one or more destinations based on the destination bitmap and the one or more bitmaps stored in the forwarding table of the first node.

Illustratively, the techniques described herein may be performed by hardware, software, and/or firmware, such as in accordance with the BIER process 248/248a, which may include computer executable instructions executed by the processor 220 (or independent processor of interfaces 210) to perform functions relating to the techniques described herein, e.g., in conjunction with routing process 244. For example, the techniques herein may be treated as extensions to conventional protocols, such as the various PLC protocols or wireless communication protocols, and as such, may be processed by similar components understood in the art that execute those protocols, accordingly.

Figure 6A:
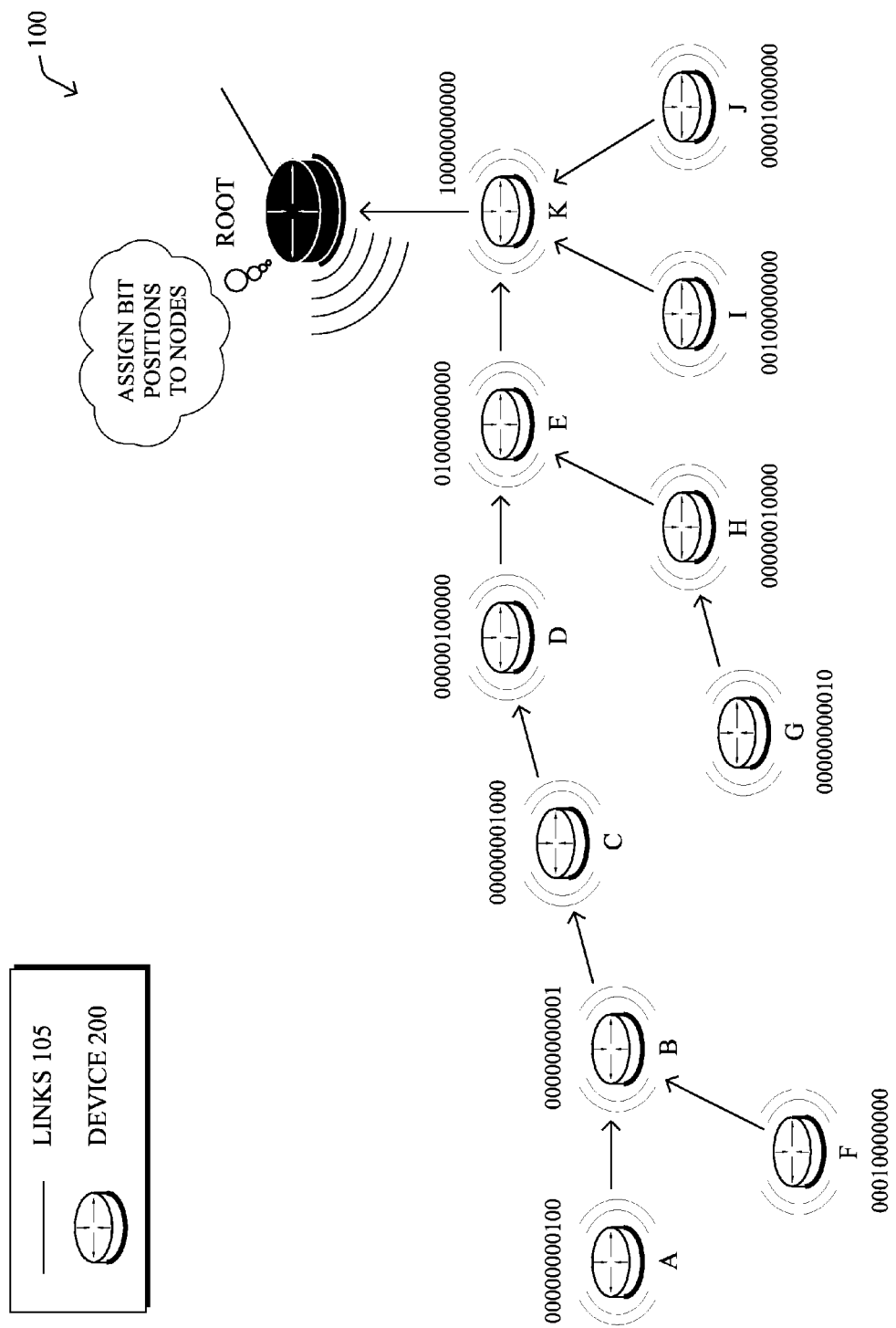
FIGS. 6A-6B illustrate examples of bit index information being used in a DAG.
Figure 6B:
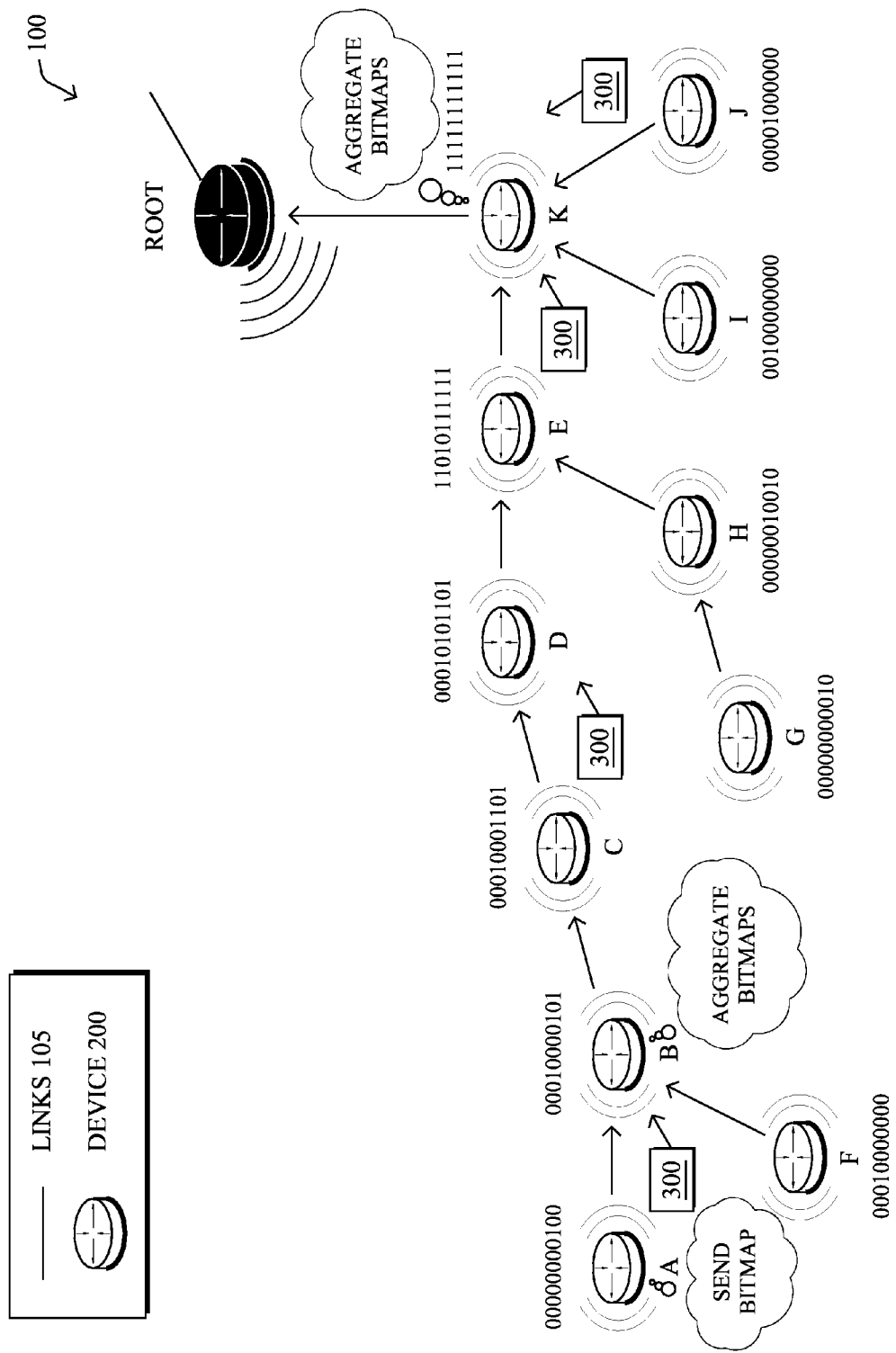

Operationally, BIER may be used in a LLN as a compression technique that maps an IPv6 address or other network address of a node into a bit position in a bitmap, according to various embodiments. FIGS. 6A-6B illustrate examples of using BIER in the network for routing, according to various embodiments. As shown in FIG. 6A, the Root node of the RPL LLN may negotiate with nodes A-K to allocate a bit position per node address, with only one address per node. In other words, the Root node or another supervisory device (e.g., one of servers 150, etc.) may assign a unique bit position of a bitmap to each of nodes A-K. Thus, the devices shown in network 100 may be represented by a bitmap having eleven bit, with each node being represented by a bit at a particular bit position in the bitmap. For example, the Root node may make the following bitmap assignments to nodes A-K:

TABLE 1

| Node | Bit Position | Bitmap |
|---|---|---|
| A | 9 | 00100000000 |
| B | 11 | 10000000000 |
| C | 8 | 00010000000 |
| D | 6 | 00000100000 |
| E | 2 | 00000000010 |
| F | 4 | 00000001000 |
| G | 10 | 01000000000 |
| H | 7 | 00001000000 |
| I | 3 | 00000000100 |
| J | 5 | 00000010000 |
| K | 1 | 00000000001 |

As shown above in Table 1, each of nodes A-K may be assigned a unique bitmap/bit position, to represent the address of the node. For example, the Root node may assign a given node to a particular bitmap/bit position during formation or re-formation of the network or at any other time (e.g., prior to initiating a routing change in the network, periodically, etc.). Once assigned, the Root may provide the assigned bitmap to the corresponding node via a message. The Root device may then use the assigned bit positions/bitmaps to map any address in the network with a bit offset.

In on embodiment, the message may be a DIO message or similar routing protocol message that propagates the bitmap assignments down into the network. For example, a DIO message propagated down the network may indicate that a potential parent of a node is in a DODAG that has room in its bitmap space (e.g., one or more bit positions that are not yet assigned to nodes). In some cases, a child node joining the network may favor a parent that has room in the bitmap (e.g., as specified by the objective function, etc.).

In various embodiments, the techniques herein may be used in conjunction with RPL or another distance vector routing protocol, whereby DAOs or similar messages may be sent to a parent in a manner similar to RPL storing mode. In some embodiments, such a DAO message may include a single bitmap that is the result of an OR operation performed on the bitmaps received via DAOs from a given node's children and the bit(s) associated with the node. For example, as shown in FIG. 6B, each node may select its DAG parent and send a corresponding DAO message 300 that includes a bitmap that identifies the node and any of that node's descendants along the DAG. In one embodiment, the bitmap included in a DAO message 300 sent by a given node to its parent may be formed by performing a logical OR operation on the node's assigned bitmap with any of bitmaps received from the node's children, if the node has DAG children. If not, the node may simply send its own bitmap to its selected parent.

In one example, consider the operation of node B when using the techniques herein. In particular, node B may receive DAO messages 300 from it child nodes A and F that include the bitmaps assigned to A and F, respectively (e.g., 00000000100 from node A and 00010000000 from node F). In response, node B may perform an OR operation on these bitmaps (e.g., to form the aggregated bitmap 00010000100), and then perform another OR operation on the result with its own assigned bit position/bitmap (e.g., 00000000001), to generate an aggregated bitmap (e.g., 00010000101) to send to its preferred parent node C via DAO message 300. In doing so, the aggregated bitmap received by node C from node B may indicate that nodes A, B, and F are downstream of node C, thereby allowing node C to make forwarding decisions using only the bit positions assigned to these nodes in the aggregated bitmap. In some embodiments, this operation can be extended to multiple parents, giving the parent the ability to select one of a plurality of children for downward traffic.

According to various embodiments, each node may store state information in its forwarding table regarding each of its children (e.g., the bitmap that it received from each child) and/or the aggregated bitmaps that identify a particular child and its own descendants. Notably, this state information may be considerably smaller than the state information that would otherwise be stored when using RPL in storing mode. For example, node B may store the following state information in its forwarding table:

TABLE 2

| Child Node | Bitmap |
|---|---|
| A | 00000000100 |
| F | 00010000000 |

In another example, consider the operation of node K using the techniques herein. Node K may operate in a manner similar to that described with reference to node B. Thus, the state information stored by node K in its forwarding table may include the bitmaps for its children (e.g., the bitmaps received from nodes E, I, and J). In particular, node K may receive the following bitmaps from its children and store the received bitmaps in its own forwarding table:

TABLE 3

| Child Node | Received Bitmap |
|---|---|
| E | 11010111111 |
| I | 00100000000 |
| J | 00000010000 |

As shown above in Table 3, the bitmaps received at node K from its children E, I, and J may indicate which nodes can be reached via each child, based on the set bits of the received bitmaps. For example, the aggregated bitmap received by node K from node E (e.g., 11010111111) in message 300 may indicate that nodes A-H can be reached by node K via node E. Similarly, the bitmaps received by node K from nodes I and J may indicate that nodes I and J are single level children of node K that do not have DAG children of their own. In turn, node K may provide a message 300 to the Root device that includes an aggregated bitmap (e.g., 11111111111) that aggregates the bitmaps received from nodes E, I, and J with that of the bitmap/bit position assigned to node K (e.g., by performing OR operations). Such a bitmap may signify to the Root node that any of nodes A-K may be reached via node K.

Figure 7A:
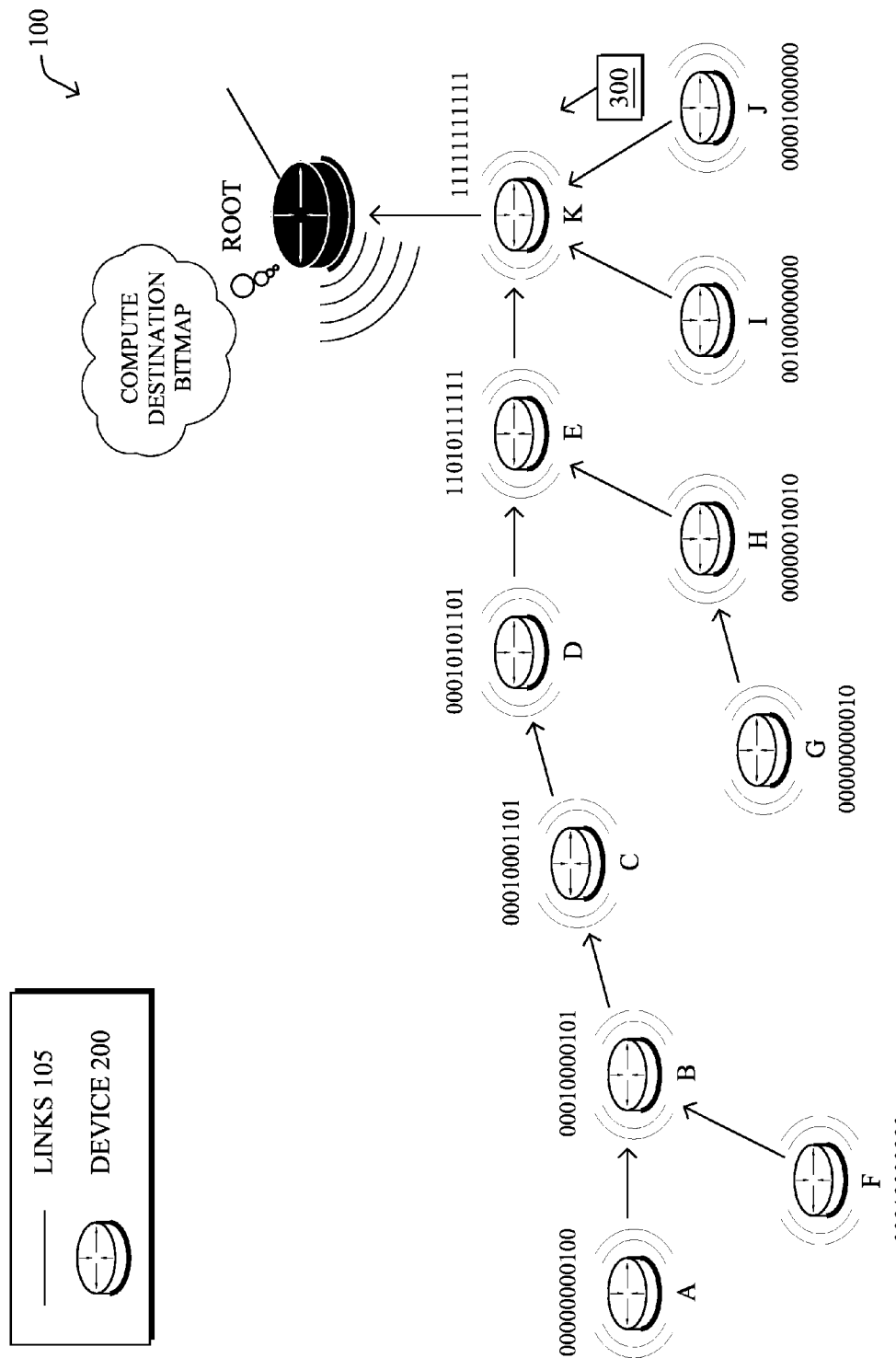
FIGS. 7A-7B illustrate examples of a message being forwarded.
Figure 7B:
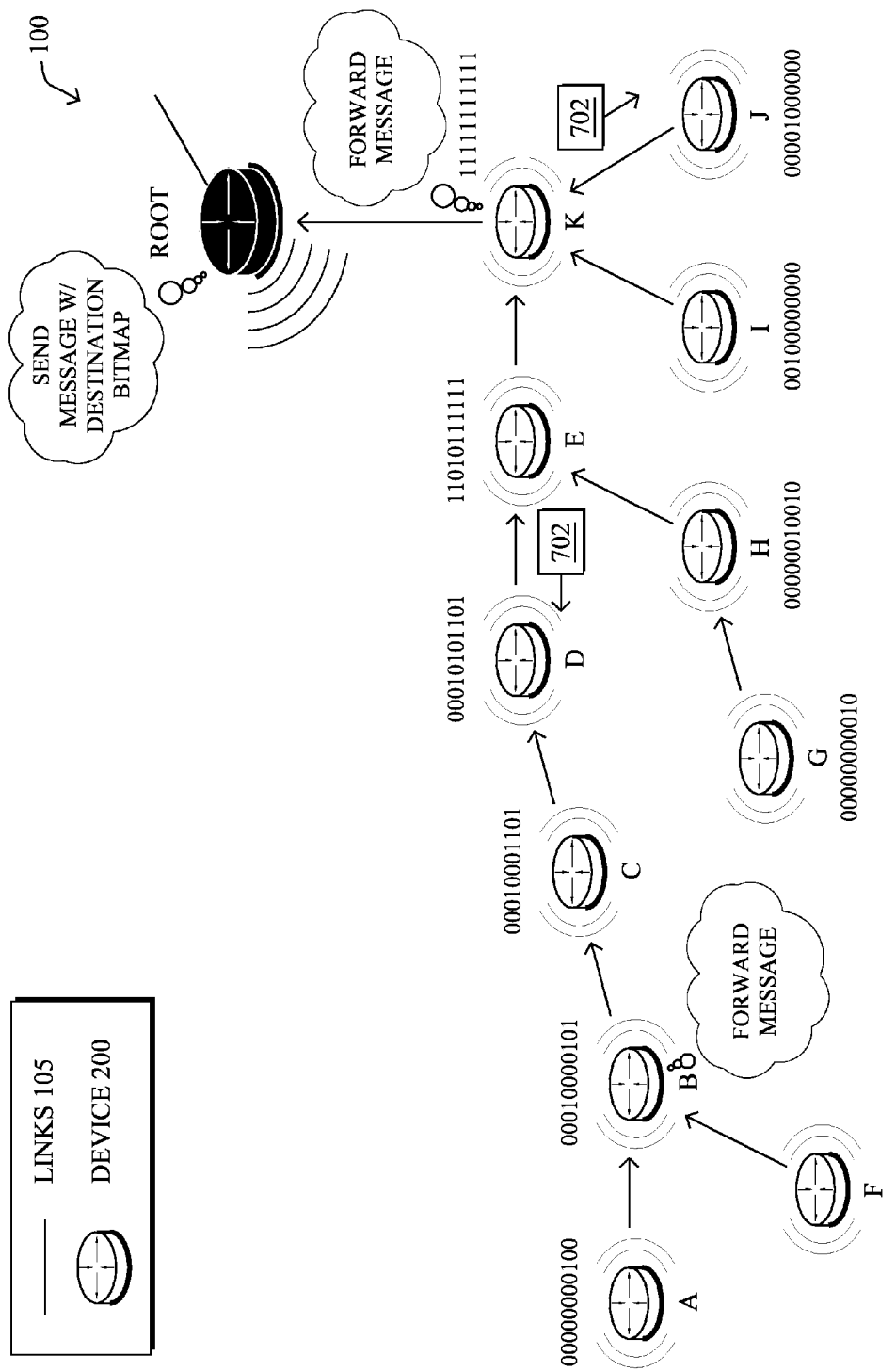

FIGS. 7A-7B illustrate examples of message forwarding in the network using the techniques herein, according to various embodiments. As shown in FIG. 7A, assume that the Root node receives a message that needs to be delivered to one or more nodes in the mesh (e.g., from one of servers 150, a device in another mesh, etc.). In such a case, in one embodiment, the Root device may compute the destination bitmap that is the result of an OR operation of the unique bitmaps/bit positions for the destination(s). For example, assume that the Root device is to send a message/packet to nodes A, F, and J, which have assigned bitmaps 00000000100, 00010000000, and 00000010000, respectively. In such a case, the Root device may determine the destination bitmap by performing logical OR operations on these bitmaps, to generate the destination bitmap 00010010100 that identifies nodes A, F, and J as destinations of the message.

As shown in FIG. 7B, the Root device may include the destination bitmap in the packet/message 702 and forward message 702 to node K. Each node may then make forwarding decisions regarding message 702 based on the destination bitmap and the bitmap(s) stored in its forwarding table. In one embodiment, a given node may determine whether the node itself is a destination by performing a logical AND operation on the destination bitmap and the unique bitmap/bit position assigned to the node. For example, node K may determine whether it is a destination of message 702 by performing an AND operation on the destination bitmap 00010010100 and its own assigned bitmap, 00000000001. If the result is non-zero, then node K may determine that it is itself a destination of message 702. Any node in network 100 may perform a similar operation, to determine whether or not message 702 is to be forwarded to one or more children of the node. For example, node K may perform an AND operation between the destination bitmap and the bitmaps stored in its forwarding table, as shown above in Table 3. The results of such operations may be non-zero for nodes E and J and zero for node I. In this way, node K may determine that message 702 should be forwarded to nodes E and J, but not to node I.

A node may forward a given message to its one or more children as a unicast message or as a broadcast message, according to various embodiments. In the case of a sparse distribution of children that need to receive the message (e.g., only a few children are interested in the message), for example, the forwarding operation may be a series of unicast messages to all of a node's interested children and sent one by one, thereby allowing the uninterested children to remain asleep. For example, a forwarding node may compute an AND operation using the destination bitmap and a given child's bitmap, for each of the forwarding node's children. When the result is true (e.g., non-zero) for a particular child node, the forwarding node may copy and send the packet as a MAC-level unicast message to the interested child.

In further embodiments, a node may forward message 702 as a broadcast message to its children. For example, in the dense case (e.g., most of the node's children are interested in the message), the forwarding node may use a broadcast transmission that is listened to by the children. It is then up to each child to perform the appropriate AND operations with its own bitmaps and accept or drop the packet, depending on the results of these operations.

A particular node may be configured to select between forwarding a message as a unicast message or as a broadcast to its children based on a policy. In some embodiments, the node may decide to forward the message as one or more unicast messages, if the number of the node's children that are interested in the message (e.g., based on the bits set in the destination bitmap) are below a threshold amount. For example, a node may elect to forward the message as a unicast message, if only a certain percentage of the node's children are to receive the message. In further embodiments, the node may decide to forward the message as a broadcast to all of its children, if the number of the node's children that are interested in the message are above a threshold amount. For example, if a high percentage of the node's children are to receive the message, the node may opt to broadcast the message to all of its children.

In one example, node K may decide to forward message 702 as two MAC level unicast messages to nodes J and E, respectively, thereby allowing node I to remain asleep during the forwarding operation. In another example, node B may elect to send message 702 as a broadcast message to nodes A and F, since the majority of its children are interested in the message. In other words, based on a policy, node B may favor broadcast communications, meaning that all of its children will have to wake and listen to the broadcasted message. In this case, it will be up to the children nodes to perform the bitmap validation between the destination bitmap and their own bitmaps. For example, both nodes A and F may accept the packet, since their corresponding bits are set in the destination bitmap (e.g., as determined by performing AND operations). However, if a child node along a branch that does not include any destinations receives a broadcast message, the result of its AND operations will be zero and the node may drop the packet, in response.

Figure 8:
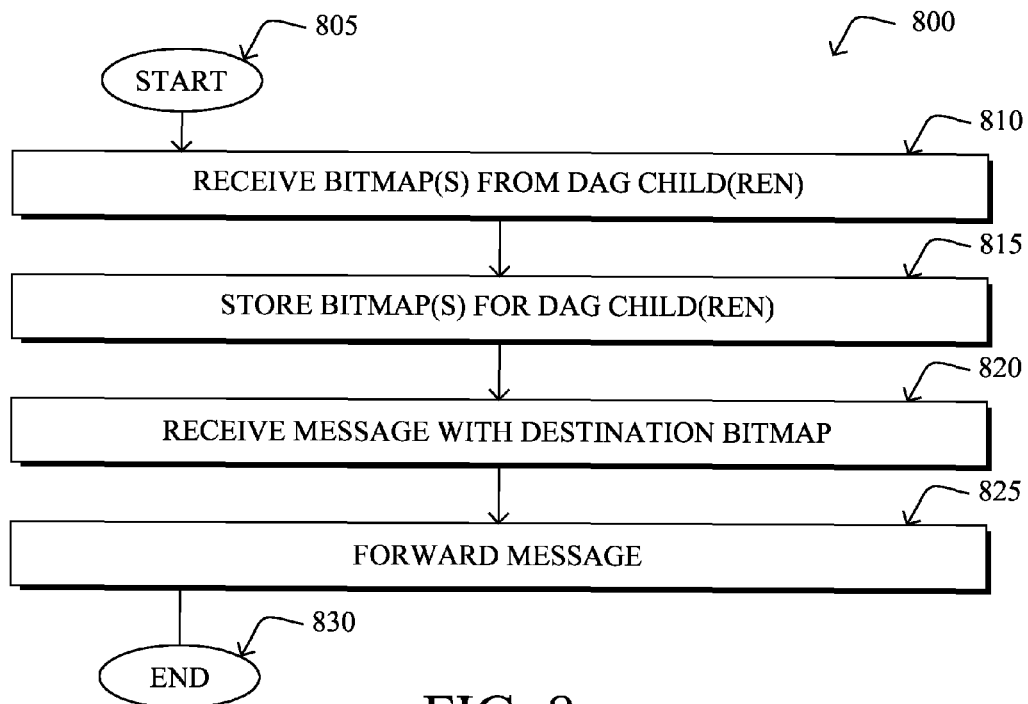
FIG. 8 illustrates an example simplified procedure for forwarding a message using bit index explicit replication (BIER)

FIG. 8 illustrates an example simplified procedure for forwarding a message using bit index explicit replication (BIER), according to various embodiments. Procedure 800 may be performed, in some cases, by a node in a network (e.g., any of nodes/devices 200, etc.). Procedure 800 begins at step 805 and continues on to step 810 where, as described in greater detail above, the node receives one or more bitmaps from one or more of its DAG children. Each of the one or more children may be associated with a unique bit position in the one or more received bitmaps. In one embodiment, the bitmap received from a particular child node may be a bitmap that was uniquely assigned to the child node (e.g., by the Root device of the network, etc.). Such a bitmap may have a bit set at a bit position associated with the child node. In another embodiment, the bitmap received from a particular child may be an aggregated bitmap that aggregates the unique bitmaps of the child node and any of descendants of the child node in the DAG. For example, assume that the child node is assigned to the bitmap 0001 and its own child is assigned to the bitmap 0010. In such a case, the aggregated bitmap that identifies both nodes may be 0011. In various embodiments, the bitmaps may be included in routing protocol messages, such as those used to construct the DAG (e.g., DAO messages, etc.).

At step 815, as described above, the node may store the received bitmap(s) in its forwarding table for each of its reporting children. In other words, the node may operate in storing mode, whereby the node stores routing state information. In some embodiments, such a table may only require bitmap entries for the direct children of the node. For example, the bitmap entry for a particular child of the node may have bits set for the child node and any descendants of that child. Such an addressing technique may significantly reduce the amount of memory that would otherwise be required for the node to make forwarding decisions in storing mode.

At step 820, the node receives a message that includes a destination bitmap that identifies one or more destinations of the message, as described in greater detail above. Such a destination bitmap may be generated (e.g., by the Root of the network, etc.) by setting the bits in the bitmap that are uniquely associated with the destinations. For example, the sending device may perform logical OR operations on the unique bitmaps assigned to the destinations, to generate the destination bitmap.

At step 825, as detailed above, the node forwards the message towards one or more of the destinations indicated by the destination bitmap. In particular, the node may compare the one or more bitmaps stored in its forwarding table to that of the destination bitmap, to determine which, if any, of the children of the node are to receive the message. For example, the node may perform a logical AND operation between the destination bitmap and the stored bitmap for one of its children. If the results of the operation are positive, this may indicate that the child node should receive the message. In some embodiments, the node may decide whether to forward the message as a unicast message to one or more of its children or as a broadcast message to all of its children. For example, the node may send the message as one or more unicast messages to specific children, if the number of children to receive the message is below a threshold amount. Conversely, if the number of children to receive the message is above a threshold amount, the node may opt to send forward the message as a broadcast to all of its children. Procedure 800 then ends at step 830.

Figure 9:
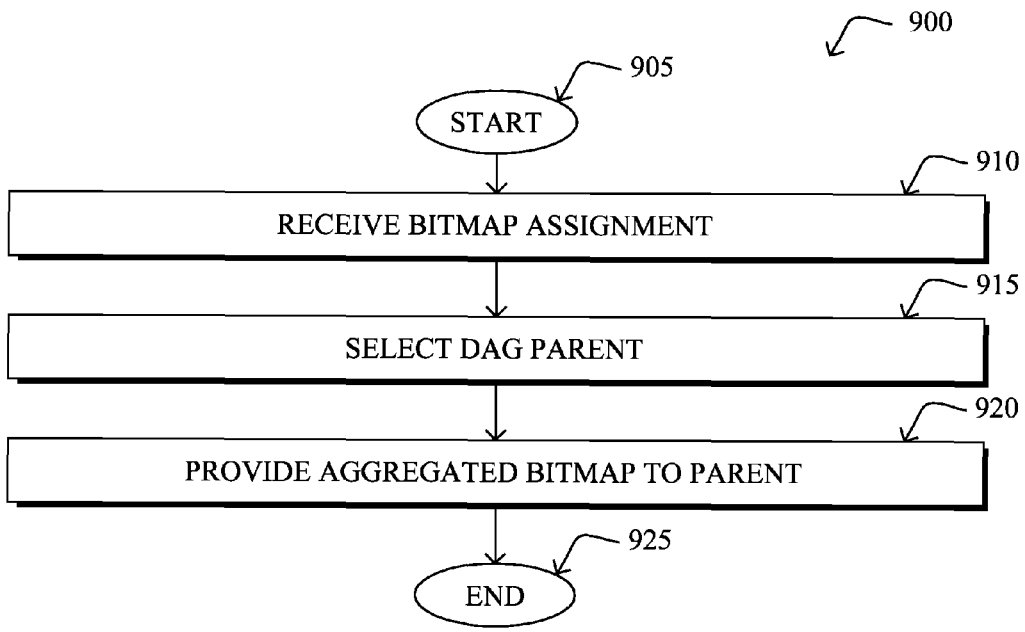
FIG. 9 illustrates an example simplified procedure for providing an aggregated bitmap to a DAG parent.

FIG. 9 illustrates an example simplified procedure for providing an aggregated bitmap to a DAG parent, according to various embodiments. Procedure 900 may begin at step 905 and continue on to step 910 where, as described in greater detail above, a node in a network may receive a bitmap assigned to the node. In various embodiments, such a bitmap may have a bit set at a position uniquely assigned to the node in the network, to identify the node.

At step 915, the node selects a DAG parent, according to various embodiments. In general, the node may select its DAG parent based on an objective function that specifies one or more goals for the construction of the DAG (e.g., minimizing packet loss, fewest hops to the Root, etc.). For example, the node may select its preferred DAG parent based on one or more routing protocol messages received by the node (e.g., a DIO message in RPL, etc.).

At step 920, the node sends an aggregated bitmap to its selected DAG parent, as detailed above. In some embodiments, the node may aggregate its assigned bitmap from step 910 with one or more bitmaps received from any nodes that in turn selected the node as their DAG parent. Such bitmaps may be uniquely assigned to the child of the node or may itself be an aggregated bitmap that also identifies the descendant nodes along the branch stemming from the particular child node. For example, the node may perform a logical OR operation on the bitmap assigned to the node and the bitmap(s) received from the one or more children of the node, to generate the aggregated bitmap to be sent to the node's selected parent. In one embodiment, the node may send the aggregated bitmap within a routing protocol message (e.g., a DAO message, etc.). Procedure 900 then ends at step 925.

Figure 10:
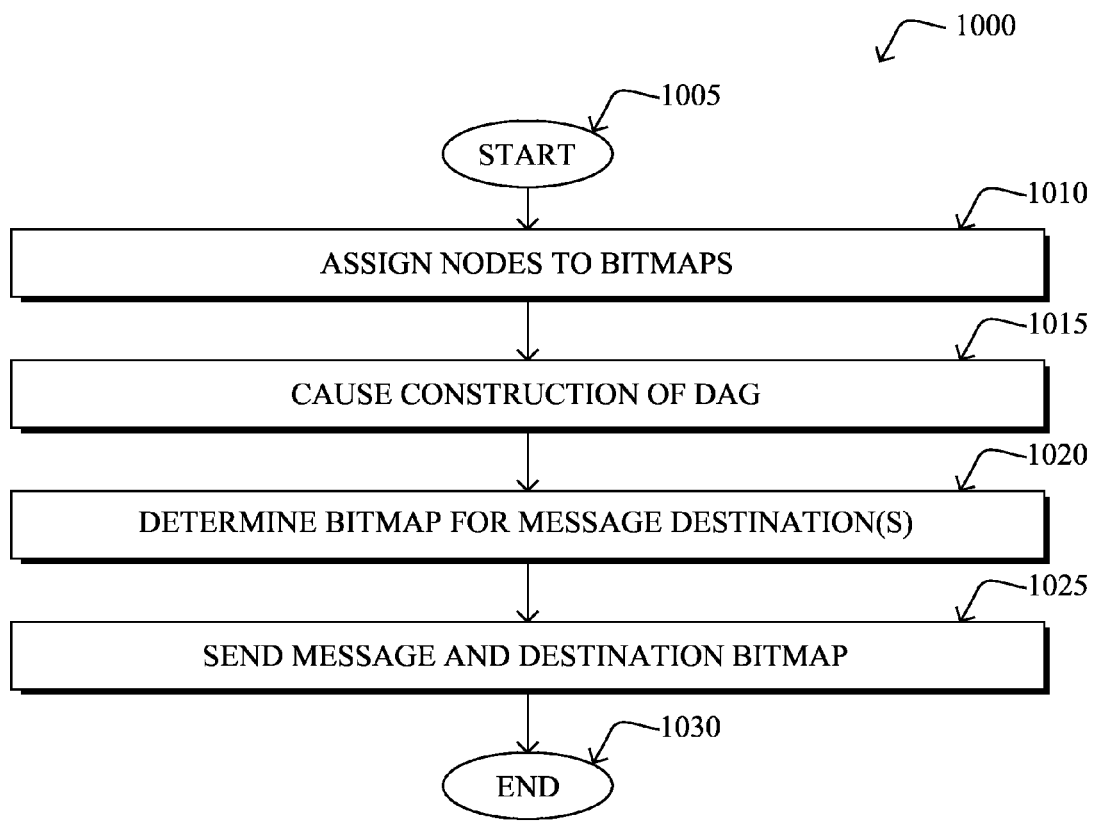
FIG. 10 illustrates an example simplified procedure for sending a message using BIER.

FIG. 10 illustrates an example simplified procedure for sending a message using BIER, according to various embodiments. Procedure 1000 may, for example, be performed by a Root device of the network or another supervisory device. Procedure 1000 begins at step 1005 and continues on to step 1010 where, as described in greater detail above, the device assigns nodes in the network to unique bitmaps/bit positions. For example, if the network includes four nodes, the Root may assign the first node to the bitmap 0001, the second node to the bitmap 0010, etc. In various embodiments, the device may notify the nodes of their respective assignments (e.g., as part of the network join process, etc.).

At step 1015, as detailed above, the device causes the nodes to construct a DAG. In some embodiments, the device may initiate construction of the DAG by sending a routing protocol message that specifies an objective function to be used by the nodes when selecting their respective parents in the DAG. For example, the device may send a DIO message if RPL is used as the routing protocol, or a similar message, if another routing protocol is used. In response, each node in the network may select its DAG parent and forward its assigned bitmap, or an aggregated bitmap as described above, to its selected parent. In addition, each node may store the bitmaps that it receives from its children in its forwarding table as part of the DAG formation.

At step 1020, the device determines a destination bitmap for a message, as described in greater detail. In various embodiments, the device may generate the destination bitmap by performing logical OR operations on the unique bitmaps/bit positions assigned to the destination nodes. For example, if the destination nodes are assigned to bitmaps 1000 and 0001, respectively, the destination bitmap may be 1001.

At step 1025, as detailed above, the device sends the message including the destination bitmap to a particular node in the network. In turn, the node may make forwarding decisions based on the destination bitmap and the bitmap(s) received by the node from its one or more children. For example, the node may perform a logical AND operation on the destination bitmap a bitmap in the node's forwarding table, to determine whether the corresponding child node should be forwarded the message. Procedure 1000 then ends at step 1030.

It should be noted that while certain steps within procedures 800-1000 may be optional as described above, the steps shown in FIGS. 8-10 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 800-1000 are described separately, certain steps from each procedure may be incorporated into each other procedure, and the procedures are not meant to be mutually exclusive.

The techniques described herein, therefore, provide for the retention of very limited state information in nodes, thereby permitting stateful operations in networks that would otherwise need to use RPL in non-storing model. In addition, the techniques herein may optimize sparse multicast distributions and enable simple and efficient forwarding decisions to be made based on AND/OR logical operations.

While there have been shown and described illustrative embodiments, it is to be understood that various other adaptations and modifications may be made within the spirit and scope of the embodiments herein. For example, the embodiments have been shown and described herein with relation to PLC networks. However, the embodiments in their broader sense are not as limited, and may, in fact, be used with other types of shared-media networks and/or protocols (e.g., wireless). In addition, while certain protocols are shown, such as RPL, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   receiving, at a first node in a network, one or more bitmaps from one or more child nodes of the first node according to a directed acyclic graph (DAG), wherein each of the one or more child nodes is associated with a corresponding unique bit position in the one or more bitmaps, wherein a particular bitmap received from a particular child node of the first node is an aggregated bitmap that identifies the particular child node and one or more children of the particular child node in a single bitmap;
   storing, in a forwarding table of the first node, the one or more bitmaps received from the one or more child nodes of the first node;
   receiving, at the first node, a message that includes a destination bitmap that identifies one or more destinations of the message via one or more set bits at the corresponding bit positions associated with the one or more child nodes; and
   forwarding, by the first node, the message towards the identified one or more destinations based on the destination bitmap and the one or more bitmaps stored in the forwarding table of the first node.

2. The method as in claim 1, wherein forwarding the message towards the identified one or more destinations comprises:
   sending, by the first node, the message to a particular child node as an individual unicast message, based on a determination that a number of the one or more child nodes identified by the destination bitmap as destinations is below a threshold amount.

3. The method as in claim 1, wherein forwarding the message towards the identified one or more destinations comprises:
   sending, by the first node, the message to the one or more child nodes as a broadcast message, based on a determination that a number of the one or more child nodes identified by the destination bitmap as destinations is above a threshold amount.

4. The method as in claim 1, further comprising:
determining, by the first node, whether a particular one of the one or more child nodes of the first node is a destination of the message by performing a logical AND operation on the destination bitmap and the bitmap stored in the forwarding table of the first node that is associated with the particular child node.

5. The method as in claim 1, further comprising:
receiving, at the first node, a bitmap assigned to the first node;
selecting, by the first node, a parent node of the first node for the DAG; and
providing, by the first node, an aggregated bitmap to the selected parent node that aggregates the bitmap assigned to the first node and the one or more bitmaps received from the one or more child nodes of the first node.

6. A method comprising:
assigning, by a device in a network, a plurality of nodes in the network to bitmaps, wherein each node is associated with a unique bit position in the bitmaps;
causing, by the device, construction of a directed acyclic graph (DAG) in the network by sending the assigned bitmaps to the plurality of nodes, wherein a particular one of the plurality of node stores one or more of the bitmaps that are assigned to one or more children of the particular node in the DAG;
determining, by the device, a destination bitmap for a message based on the assigned bitmaps and one or more of the nodes selected as destinations for the message; and
sending, by the device, the message and the destination bitmap to the particular node, wherein the particular node forwards the message based on the destination bitmap and on the one or more of the bitmaps assigned to the one or more children of the particular node in the DAG,
wherein the particular node determines whether to forward the message as a unicast message or as a broadcast message based on the destination bitmap and on the one or more of the bitmaps assigned to the one or more children of the particular node in the DAG.

7. The method as in claim 6, wherein determining, by the device, the destination bitmap for the message based on the mapped bitmaps and on one or more destinations for the message comprises:
identifying, by the device, the bitmaps mapped to the destinations; and
aggregating, by the device, the bitmaps mapped to the destinations into the destination bitmap.

8. The method as in claim 7, wherein aggregating, by the device, the bitmaps mapped to the destinations into the destination bitmap comprises:
performing, by the device, a logical OR operation on the bitmaps mapped to the destinations, to form the destination bitmap.

9. The method as in claim 6, wherein causing, by the device, construction of a directed acyclic graph (DAG) in the network by sending the mapped bitmaps to the plurality of nodes comprises:
sending, by the device, a routing protocol message to the plurality of nodes, wherein the routing protocol message includes the mapped bitmaps.

10. An apparatus, comprising:
one or more network interfaces to communicate with a computer network;
a processor coupled to the one or more network interfaces and configured to execute a process; and
a memory configured to store the process executable by the processor, the process when executed operable to:
receive one or more bitmaps from one or more child nodes of the apparatus according to a directed acyclic graph (DAG), wherein each of the one or more child nodes is associated with a corresponding unique bit position in the one or more bitmaps, wherein a particular bitmap received from a particular child node of the first node is an aggregated bitmap that identifies the particular child node and one or more children of the particular child node in a single bitmap;
store, in a forwarding table in the memory, the one or more bitmaps received from the one or more child nodes of the apparatus;
receive a message that includes a destination bitmap that identifies one or more destinations of the message via one or more set bits at the corresponding bit positions associated with the one or more child nodes; and
forward the message towards the identified one or more destinations based on the destination bitmap and the one or more bitmaps stored in the forwarding table.

11. The apparatus as in claim 10, wherein the apparatus forwards the message towards the identified one or more destinations by:
sending the message to a particular child node as an individual unicast message, based on a determination that a number of the one or more child nodes identified by the destination bitmap as destinations is below a threshold amount.

12. The apparatus as in claim 10, wherein the apparatus forwards the message towards the identified one or more destinations by:
sending the message to the one or more child nodes as a broadcast message, based on a determination that a number of the one or more child nodes identified by the destination bitmap as destinations is above a threshold amount.

13. The apparatus as in claim 10, wherein the process when executed is further operable to:
determine whether a particular one of the one or more child nodes of the apparatus is a destination of the message by performing a logical AND operation on the destination bitmap and the bitmap stored in the forwarding table that is associated with the particular child node.

14. The apparatus as in claim 10, wherein the process when executed is further operable to:
receive a bitmap assigned to the apparatus;
select a parent node of the apparatus for the DAG; and
provide an aggregated bitmap to the selected parent node that aggregates the bitmap assigned to the first node and the one or more bitmaps received from the one or more child nodes of the first node.

15. An apparatus, comprising:
one or more network interfaces to communicate with a computer network;
a processor coupled to the one or more network interfaces and configured to execute a process; and
a memory configured to store the process executable by the processor, the process when executed operable to:

assign a plurality of nodes in the network to bitmaps, wherein each node is associated with a unique bit position in the bitmaps;

cause construction of a directed acyclic graph (DAG) in the network by sending the assigned bitmaps to the plurality of nodes, wherein a particular one of the plurality of node stores one or more of the bitmaps that are assigned to one or more children of the particular node in the DAG;

determine a destination bitmap for a message based on the assigned bitmaps and one or more of the nodes selected as destinations for the message; and send the message and the destination bitmap to the particular node, wherein the particular node forwards the message based on the destination bitmap and on the one or more of the bitmaps assigned to the one or more children of the particular node in the DAG wherein the particular node determines whether to forward the message as a unicast message or as a broadcast message based on the destination bitmap and on the one or more of the bitmaps assigned to the one or more children of the particular node in the DAG.

16. The apparatus as in claim 15, wherein the apparatus determines the destination bitmap for the message by:
identifying the bitmaps mapped to the destinations; and
aggregating the bitmaps mapped to the destinations into the destination bitmap.

17. The apparatus as in claim 16, wherein the apparatus aggregates the bitmaps mapped to the destinations into the destination bitmap by:
performing a logical OR operation on the bitmaps mapped to the destinations, to form the destination bitmap.

18. The apparatus as in claim 15, wherein the apparatus causes construction of the DAG by:
sending, to the plurality of nodes, a routing protocol message that includes the mapped bitmaps.

* * * * *